United States Patent [19]
Sonoda et al.

[11] Patent Number: 5,405,719
[45] Date of Patent: Apr. 11, 1995

[54] PRISMATIC SEALED ALKALINE STORAGE BATTERY WITH NICKEL HYDROXIDE ELECTRODE

[75] Inventors: Teruo Sonoda; Hideo Yasuda, both of Kyoto, Japan

[73] Assignee: Japan Storage Battery Company Limited, Kyoto, Japan

[21] Appl. No.: 155,289

[22] Filed: Nov. 22, 1993

Related U.S. Application Data

[63] Continuation of Ser. No. 880,558, May 8, 1992.

[30] Foreign Application Priority Data

May 10, 1991 [JP] Japan .................. 3-135927

[51] Int. Cl.⁶ .......................................... H01M 4/32
[52] U.S. Cl. .............................. 429/223; 429/235
[58] Field of Search ........................... 429/223, 235

[56] References Cited

U.S. PATENT DOCUMENTS

| | | | |
|---|---|---|---|
| 4,016,091 | 4/1977 | Jackovitz et al. | 429/223 X |
| 4,251,603 | 2/1981 | Matsumoto et al. | 429/235 X |
| 4,935,318 | 6/1990 | Ikoma et al. | 429/223 X |
| 4,957,543 | 9/1990 | Babjak et al. | 429/235 X |
| 5,244,758 | 9/1993 | Bronoel et al. | 429/223 |

FOREIGN PATENT DOCUMENTS

| | | |
|---|---|---|
| 0432342 | 6/1991 | European Pat. Off. |
| 62-64062 | 3/1987 | Japan |
| 63-124373 | 5/1988 | Japan |

OTHER PUBLICATIONS

Chemical Abstracts, vol. 102, No. 12, 1985 (Month unavailable) Abstract No. 98401d.

*Primary Examiner*—Stephen Kalafut
*Attorney, Agent, or Firm*—Mion, Zinn, Macpeak & Seas Sughrue

[57] ABSTRACT

A prismatic sealed alkaline storage battery with a nickel hydroxide electrode comprising a nickel substrate having a porosity of from 86 to 98% and containing as an active material from 10 to 20% by weight of cobalt based on the sum of nickel and cobalt; the alkaline storage battery using the same as a positive electrode and a mixed solution as an electrolyte comprising sodium hydroxide and potassium hydroxide. The battery has a high Ah efficiency in a wide temperature range, a higher energy density and a longer operating life in a low termperature of 0° C. or less and a high temperature of 50° C. or more, thereby providing a prismatic sealed alkaline storage battery for the power sources including cycle service use, such as electric vehicles.

12 Claims, 9 Drawing Sheets

PRISMATIC SEALED ALKALINE STORAGE BATTERY WITH NICKEL HYDROXIDE ELECTRODE

This is a Continuation of application Ser. No. 07/880,558 filed May 8, 1992.

FIELD OF THE INVENTION

This invention relates to a prismatic sealed alkaline storage battery with a nickel hydroxide electrode.

BACKGROUND OF THE INVENTION

Widely spread storage batteries include lead-acid batteries and nickel-cadmiumbatteries. With the latest tendency to size and weight reduction of electronic equipment, it has been demanded to develop storage batteries having high energy density. Further, from the standpoint of environmental conservation, electric vehicles or electrical motorbikes causing no environmental pollution have been exploited for practical application, and development of a high performance storage battery for this use is expected. To meet these demands, development of an alkaline storage battery of a new type such as a nickel-zinc battery and a nickel-metal hydride battery as well as improvement of the existing storage batteries in performance properties have been hastened. Such newly developed or improved storage batteries have already been put to practical use in some fields.

Alkaline storage batteries, e.g., a nickel-cadmium battery, a nickel-zinc battery, and a nickel-metal hydride battery, use nickel hydroxide as a main active material of the positive electrode. However, charging of the nickel hydroxide electrode should be carried out with an electricity quantity corresponding to 105 to 150% of the capacity because charging is apt to be accompanied with oxygen evolution as shown by formula (1) below to cause reductions in charging efficiency of active material expressed by utilization and ampere-hour (Ah) efficiency. This means that the conventional nickel hydroxide electrode cannot achieve a prescribed capacity unless it is overcharged. In the state-of-the-art sealed alkaline storage batteries, the sealed system is maintained by setting the capacity of the negative electrode larger than that of the positive electrode so that the positive electrode is always charged first to the full while the oxygen gas evolved from the positive electrode is effectively absorbed on the negative electrode (recombination of oxygen). For example, in a sealed nickel-cadmium battery, oxygen gas is absorbed on the negative electrode through exothermic reaction shown by formula (2).

(1)

(2)

Small-sized alkaline storage batteries whose capacity is less than about 10 Ah are usually assembled by using a metallic case. Charging of these batteries with constant current is controlled by detecting a temperature rise due to heat generation in the overcharge region by means of a thermistor, etc., by detecting a drop of charging voltage due to oxygen gas recombination, or by detecting an internal pressure rise by means of a pressure sensor. Since the rate constant of the oxygen gas recombination reaction is proportional to the partial oxygen pressure, the higher the pressure of the battery, the more advantageous for the gas recombination reaction. In the case of rapid charging, a cylindrical battery which is less liable to deformation or breakage even if the internal pressure increases is preferred to a rectangular battery. Even in using a cylindrical battery, the charging rate is 1 C at the highest. From the viewpoint of energy density, a rectangular battery is preferred to a cylindrical one for space saving, but its charging rate is 0.3 C at the highest due to lower mechanical strength by pressure increase.

On the other hand, large-sized alkaline storage batteries having a capacity of more than about 10 Ah, such as stationary batteries (industrial batteries) and batteries for electric vehicles, have a rectangular shape for space saving. Their pressure tolerance is not more than 4 $kg/cm^2$ even in using a metallic battery case, making it difficult to obtain a sealed system except for a float type batteries. Accordingly, large-sized alkaline storage batteries are usually used a vent type batteries needing water replenishment. In particular, because batteries which are repeatedly charged and discharged, such as those for electric vehicles, are usually charged at a charging rate of 0.1 C or more, the gas recombination reaction rate is limited, making it very difficult to obtain a sealed system. Nevertheless, there has recently been a keen demand for a large-sized alkaline storage battery having not only an increased energy density but a sealed system which does not need water replenishment. For use in electric vehicles, since gravimetric energy density is regarded more important than volumetric energy density, a plastic case having lower pressure tolerance than a metallic case is generally employed for weight reduction. However, use of a plastic case increases the possibility that a safety valve operates before the gas recombination reaction rate reaches equilibrium state.

There is proposed a method for charging an alkaline storage battery in which an increase in charging voltage based on the polarization of positive electrode is monitored, but the increase in charging voltage is from only 100 to 150 mV at the highest. Further, since the increase in voltage becomes smaller as the temperature increases, the values obtained should be compensated for a temperature change. Furthermore, the reliability is so low that constant voltage charging does not apply to its system by a phenomenon so-called "thermal run-away", which may lead to a failure of a battery. In addition, since an improvement in performance of the gas recombination reaction at the negative electrode is limited, there has been no means but using an extremely low charging current in charging of large-sized sealed batteries.

As previously described, charging of the conventional nickel hydroxide positive electrode is accompanied with oxygen gas evolution before it is fully charged. If the oxygen gas is not completely absorbed on the negative electrode and dissipates outside through a safety valve, the negative electrode is charged by the electricity quantity corresponding to the quantity of oxygen gas dissipated. While cadmium hydroxide remains in the negative electrode as a charge reserve, it is charged and converted to metallic cadmium. In the course of time, chargeable cadmium hydroxide is exhausted, then hydrogen gas evolution from the negative electrode commences. As a result, the amount of electrolyte decreases, and the capacity of the positive limiting battery on discharge decreases.

The nickel hydroxide electrode has an additional disadvantage of considerable reduction in charging efficiency in high temperatures. This is because a difference between potential of oxidation of nickel hydroxide to nickel oxyhydroxide on charge and that of oxygen evolution becomes small in a high temperature so that a competitive oxygen evolution reaction, tends to predominate in the course of charging. As an approach to an improvement in high temperature performance of the nickel hydroxide electrode, various additives have been studied. Among them, it has been proposed to co-precipitate cobalt hydroxide together with nickel hydroxide to form a solid solution as reported, e.g., in *Journal of the Electrochemical Society Japan*, Vol. 31, No. 1-2, p. 47 (1963), U.S. Pat. Nos. 3,951,686 and 4,603,094, *GS News Technical Report*, Vol. 36, No. 2, p. 31 (1977), Japanese Patent Publication No. Sho. 56-36796, and Japanese Patent Unexamined Publication No. Sho. 50-132441. Cobalt hydroxide is capable of forming a solid solution with nickel hydroxide, and there is a tendency that the charging potential becomes less noble according as the amount of the solid solution formed increases. In other words, the difference between the potential of charging and that of oxygen evolution becomes large to suppress the competing oxygen evolution reaction, resulting in an improvement in charging efficiency. The amount of cobalt hydroxide to be added varies depending on the use of a battery. For example, it is from 1 to 8% by weight for batteries subject to cycles of charge and discharge. For trickle use in high temperature, for example, as a power source of an emergency lamp where the temperature reaches 45° C., cobalt hydroxide is usually added in an amount of from 8 to 20% by weight while using a sodium hydroxide solution as an electrolyte. However, an increase in amount of cobalt hydroxide added causes not only a reduction in discharging voltage, resulting in a reduction in energy density, but also an increase in cost. The power source of electric vehicles or motorbikes is used in a wide temperature range of from −10° C. in winter to 60° to 70° C. in summer and should be subjected to repetition of charge-discharge cycles. In seeking for batteries having a higher energy density than lead-acid batteries for this use, alkaline storage batteries using nickel hydroxide electrode, e.g., a nickel-cadmium battery, a nickel-zinc battery, and a nickel-metal hydride battery, are considered as candidates. The substrate supporting an active material of the positive electrode of these alkaline storage batteries include nickel porous substrates, e.g., a sintered nickel substrate, a foamed nickel substrate, and a fibrous nickel substrate. An increased energy density can be obtained by increasing the porosity of these substrates to which an active material is applied. It turned out, however, that a substrate having a porosity of 86% or more filled with an active material undergoes expansion in dimension ascribed to volumetric change of the active material upon charging particularly in a low temperature of 0° C. or below, causing reduction of battery life and that the active material of the positive electrode has a reduced charging efficiency when charged in a high temperature of 60° to 70° C., resulting in a great reduction in battery capacity. These problems particularly arising with batteries using a low pressure-resistant plastic case, it has been impossible to apply to such batteries the accepted know-how relating to addition of cobalt hydroxide, for example, an optimum amount to be added and an optimum composition of an electrolyte.

SUMMARY OF THE INVENTION

An object of the present invention is to provide a prismatic sealed alkaline storage battery with a nickel hydroxide electrode having a high energy density and an excellent Ah efficiency in a wide temperature range.

The above objects of the present invention are accomplished by a nickel hydroxide electrode comprising a substrate having a porosity of from 86 to 98% filled with an active material containing cobalt hydroxide forming a solid solution with nickel hydroxide at a metallic ratio of from 10 to 20% by weight.

The term "metallic ratio" as used herein means an weight ratio of cobalt to the sum of cobalt and nickel $[Co/(Ni+Co) \times 100]$.

The nickel hydroxide electrode of the present invention exhibits markedly improved performance properties especially in high temperatures of 50° C. or more and low temperatures of 0° C. or lower. When it is used in a prismatic sealed alkaline storage battery in which a low pressure-tolerance case is used so that the working pressure of a safety valve cannot be set high, oxygen gas evolution on charge can be suppressed to thereby minimize a capacity reduction with charge-discharge cycles. It has found that the charging efficiency of the nickel hydroxide electrode of the present invention in high temperatures can further be improved by using an alkaline solution mainly comprising sodium hydroxide. The present invention thus makes it possible to obtain a prismatic sealed alkaline storage battery having an increased energy density and therefore applicable to new uses, such as electric vehicles.

DETAILED DESCRIPTION OF THE INVENTION

Alkaline storage batteries to which the nickel hydroxide positive electrode is applicable include a nickel-cadmium battery, a nickel-zinc battery, and a nickel-metal hydride battery. The present invention will hereinafter be described in detail chiefly by referring to working examples of a nickel-cadmium battery which is now used most, but it should be understood that the present invention is not deemed to be limited to these examples. All the parts, percents, and ratios are by weight unless otherwise indicated.

EXAMPLE 1

Figure 1:
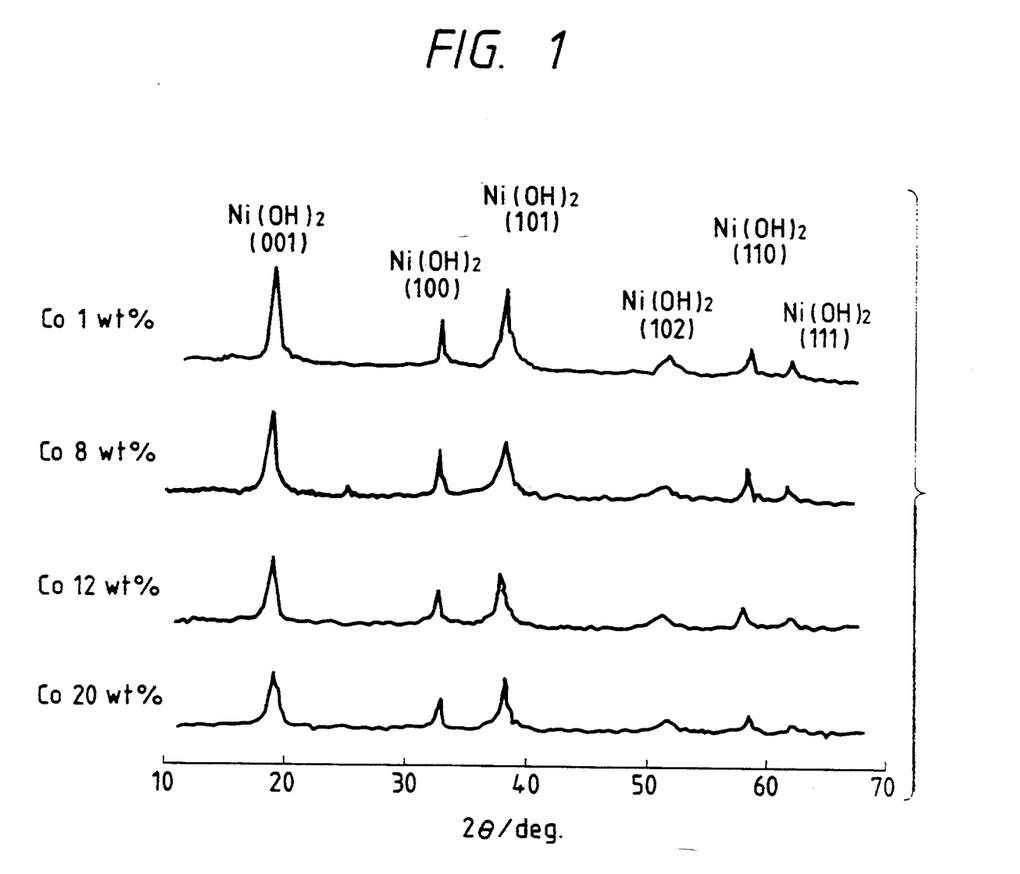
FIG. 1 is X-ray diffraction patterns of the nickel hydroxide active materials according to the present invention.

Cobalt hydroxide was added to nickel hydroxide at a metallic ratio of 1, 8, 12, or 20% to obtain spherical nickel hydroxide powder as an active material of a positive electrode. The diffraction pattern of each active material in X-ray diffractometry is shown in FIG. 1. It is seen that no peak of cobalt hydroxide alone appears, revealing the formation of solid solution of nickel hydroxide and cobalt hydroxide.

Eighty-five parts of each active material and 15 parts of carbonyl nickel powder were dispersed in water containing a small amount of methyl cellulose to obtain an aqueous paste. The paste was applied to a foamed nickel porous substrate having a thickness of 1.7 mm and a porosity of 96% ("Cellmet" produced by Sumitomo Electric Industries, Ltd.), dried at 100° C. for 30 minutes, and pressed to a size of 30×40×1.0 mm. The resulting positive electrode had a theoretical capacity of about 500 mAh (based on the nickel and cobalt present in the active material). The electrode was wrapped in 0.2 mm thick polyamide nonwoven cloth and then assembled with a pair of sintered cadmium negative electrode having a sufficient capacity into a flooded type cell. The resulting cell was tested by repeatedly subjecting to charge-discharge cycles using a 5.9M potassium hydroxide solution or a 7.1M sodium hydroxide solution as an electrolyte as follows.

First of all, charging and discharging cycle were done three times each at 23° C. with a current of 0.2 C for formation process. After confirming the capacity, a charge-discharge cycle test was carried out at 23° C., 50° C., or 70° C. under the following conditions.

Conditions of the 4th and 5th cycles:
  Charge: 100 mA (0.2 C) for 5 hrs
  Discharge: 100 mA (0.2 C) to an end discharge voltage of 0.8 V/cell Conditions of the 6th cycle:
  Charge: 100 mA (0.2 C) to the quantity of electricity discharged in the 5th cycle
  Discharge: 100 mA (0.2 C) to an end discharge voltage of 0.8 V/cell The values of active material utilization and Ah efficiency were calculated from the charge-discharge test results of the 5th and 6th cycles according to the following equations:

$$\text{Active Material Utilization (\%)} = \frac{\text{Discharged Capacity}}{\text{Theoretical Capacity}} \times 100$$

$$\text{Ah Efficiency (\%)} = \frac{\text{Discharged Capacity}}{\text{Charged Electricity Quantity}} \times 100$$

Figure 2:
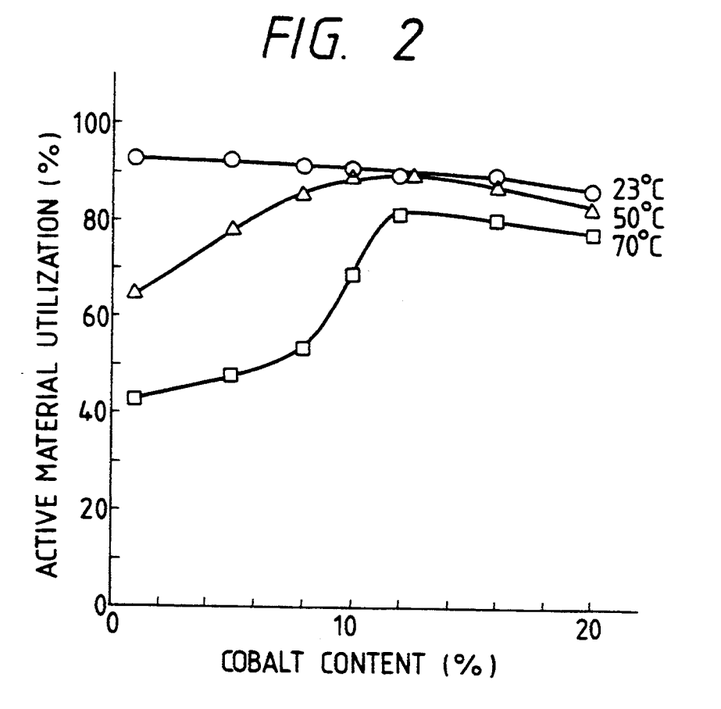
FIG. 2 is a graph of cobalt content vs. active material utilization of a foamed nickel positive electrode in a potassium hydroxide electrolyte solution.
Figure 3:
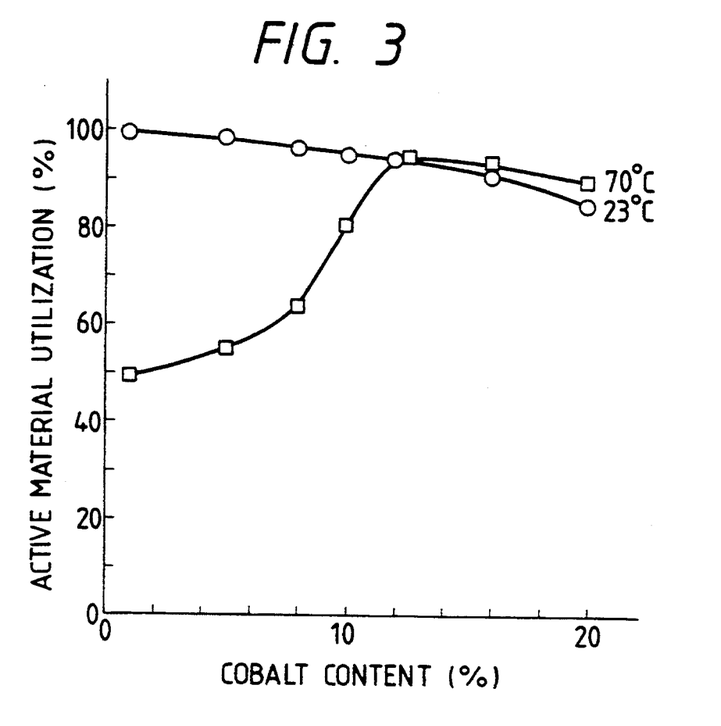
FIG. 3 is a graph of cobalt content vs. active material utilization of a foamed nickel positive electrode in a sodium hydroxide electrolyte solution.

The relationship between cobalt content in the active material and active material utilization in the KOH or NaOH solution is shown in FIG. 2 or 3, respectively. It can be seen that, with the cobalt content being less than 10%, the active material utilization greatly decreases as the temperature increases in either of the electrolyte. To the contrary, with the cobalt content within a range of from 10 to 20%, the utilization keeps a satisfactory level without showing a substantial decrease even at 70° C. In other words, in cases where a positive electrode using a highly porous nickel substrate is used in a high temperature range, e.g., at 70° C., the active material utilization can greatly be improved by incorporating cobalt into an active material at a metallic ratio of from 10 to 20%.

Figure 4:
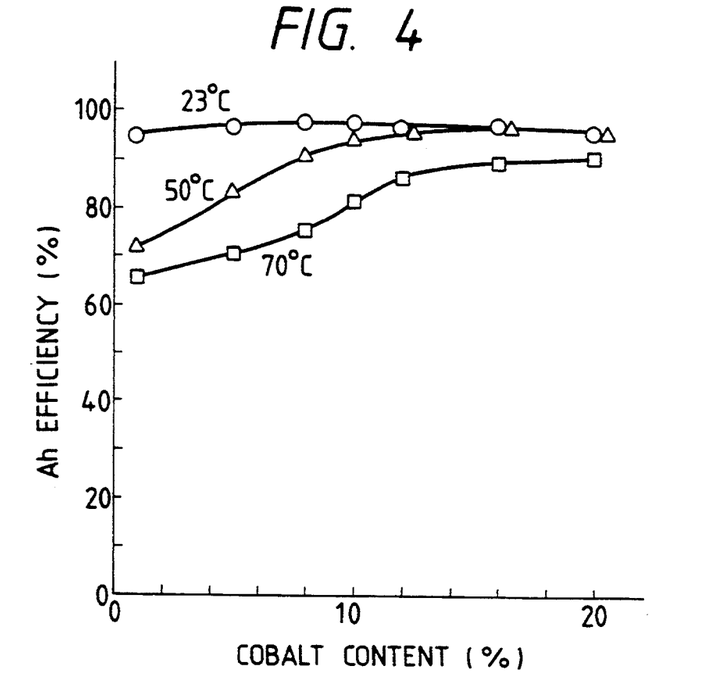
FIG. 4 is a graph of cobalt content vs. Ah efficiency of a foamed nickel positive electrode in a potassium hydroxide electrolyte solution.
Figure 5:
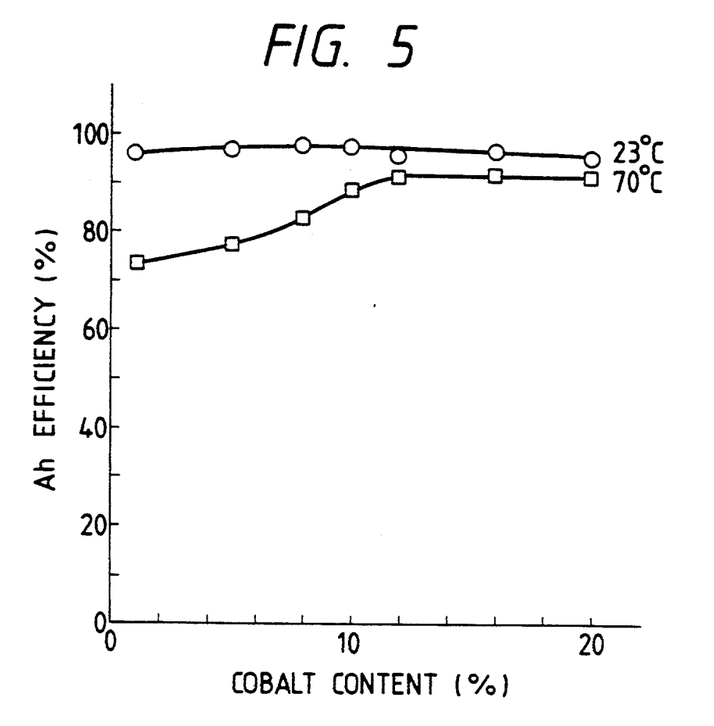
FIG. 5 is a graph of cobalt content vs. Ah efficiency of a foamed nickel positive electrode in a sodium hydroxide electrolyte solution.

The relationship between cobalt content and Ah efficiency in the KOH or NaOH solution is shown in FIG. 4 or 5, respectively. Similarly to the active material utilization, the Ah efficiency decreases with an increase of temperature with the cobalt content being less than 10%, whereas it does not substantially decrease as long as the cobalt content is between 10% and 20%.

It has thus been ascertained that an active material utilization on a highly porous substrate and an Ah efficiency, which has a great influence on capacity retention against repetition of charge-discharge cycles as hereinafter described, are satisfactory with a cobalt content in the active material being in a range of from 10 to 20%. It further turned out that this effect is more pronounced in a foamed nickel electrode using a spherical nickel hydroxide active material (hereinafter described) than in a sintered nickel hydroxide electrode.

Figure 6:
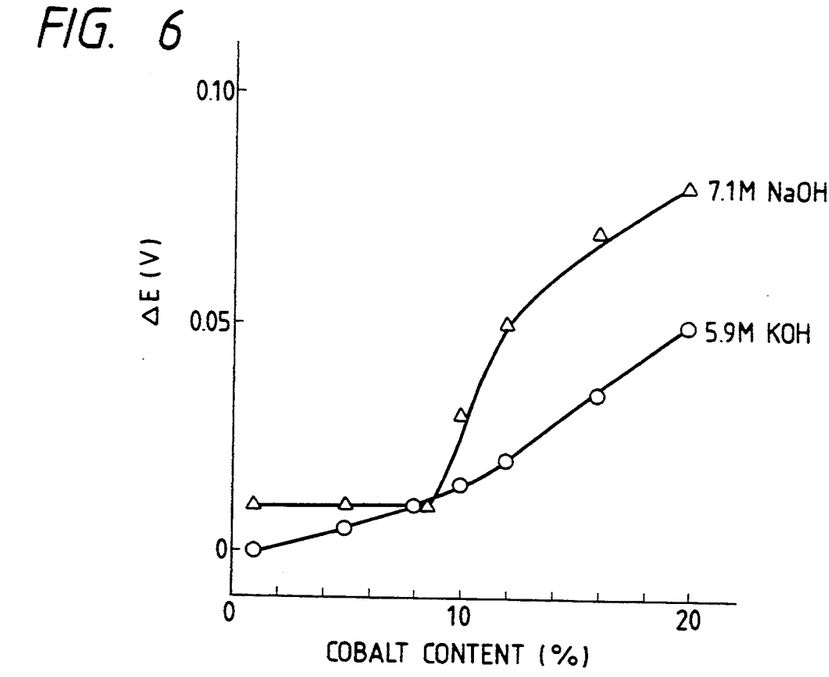
FIG. 6 is a graph of cobalt content vs. $\Delta E$ of a foamed nickel positive electrode.

In order to examine the influences of cobalt content on Ah efficiency in a positive electrode using a highly porous nickel substrate, the potential of oxidation of nickel hydroxide to nickel oxyhydroxide on charge was compared with that of oxygen evolution in the final stage of charging. A difference between the potential at the point when 50% of the theoretical capacity of the nickel hydroxide active material is charged and that at the point when oxygen is evolved was taken as $\Delta E$. The relationship between cobalt content vs. $\Delta E$ at 70° C. in the KOH or NaOH solution is shown in FIG. 6. It is apparent from FIG. 6 that, with the cobalt content being less than 10%, $\Delta E$ is approximately zero, indicating that the potential causing oxygen evolution had been reached on charging of 50% of the theoretical capacity and, after that, charging did not proceed any more. On the other hand, with the cobalt content being from 10 to 20%, $\Delta E$ shows an increase with an increase in cobalt content, indicating progress of charging of the nickel hydroxide electrode. This tendency is revealed more markedly in using a sodium hydroxide solution as an electrolyte than in using a potassium hydroxide solution. It is seen from all these results that charging efficiency can be improved significantly by incorporating 10 to 20% of cobalt into a nickel hydroxide active material and using a sodium hydroxide solution as an electrolyte.

Figure 7:
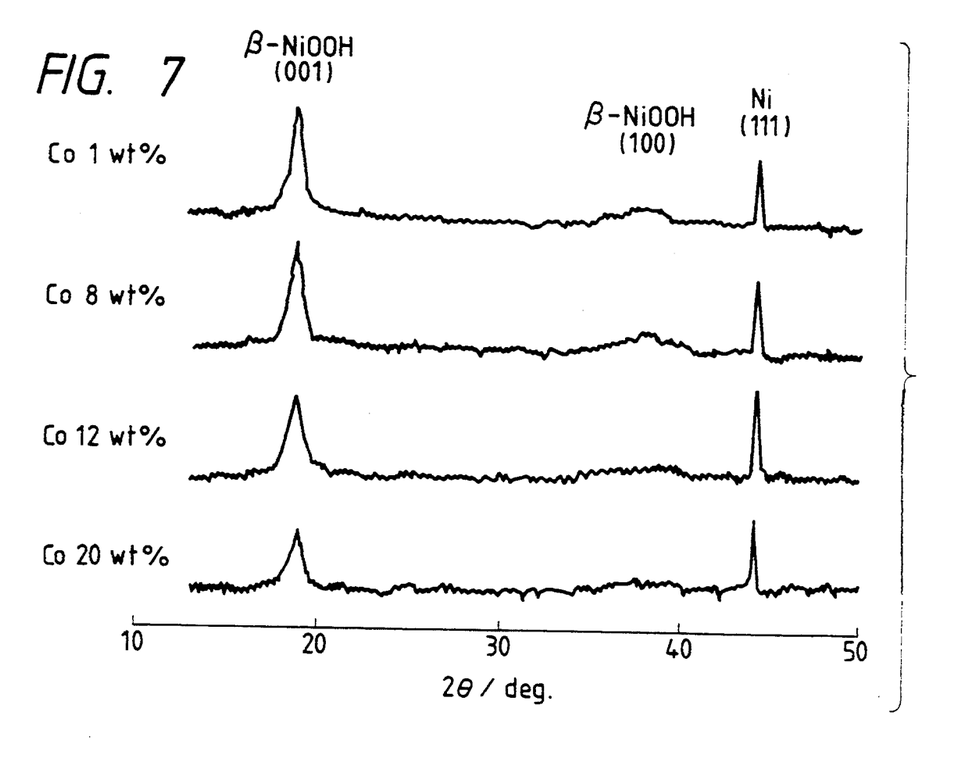
FIG. 7 is X-ray diffraction patterns of a charging product of a foamed nickel positive electrode at 23° C.
Figure 8:
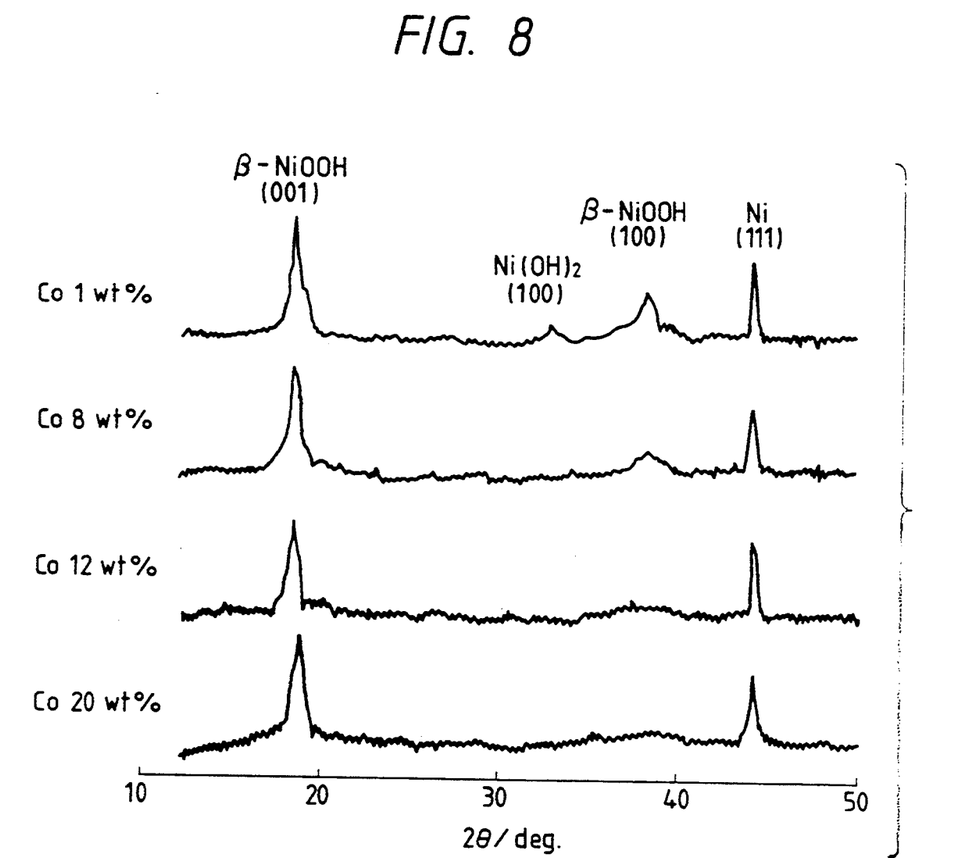
FIG. 8 is X-ray diffraction patterns of a charging product of a foamed nickel positive electrode at 50° C.
Figure 9:
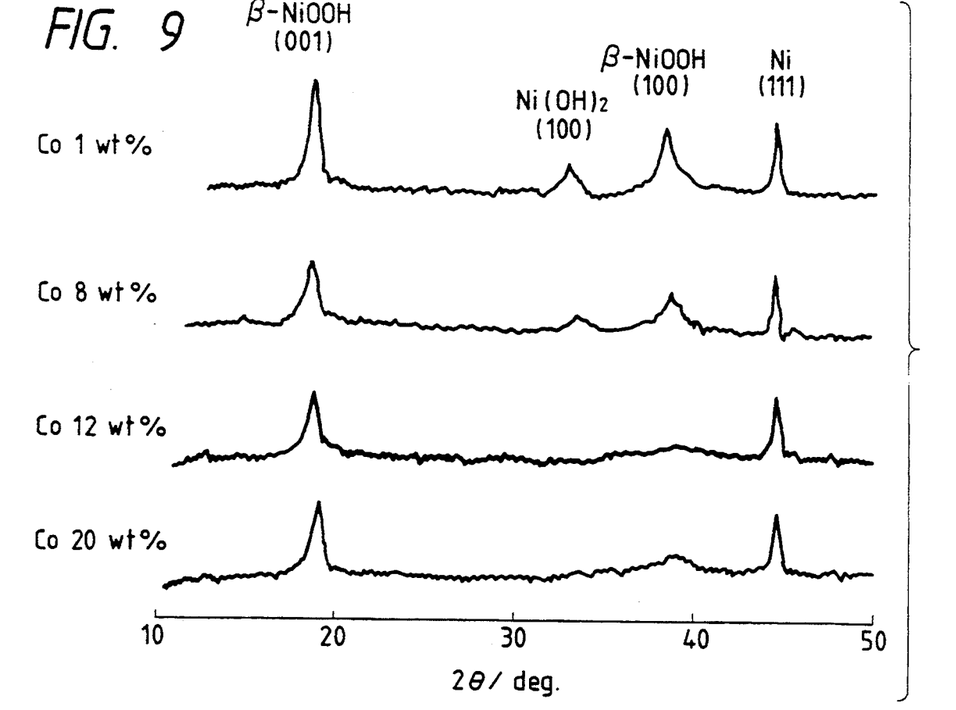
FIG. 9 is X-ray diffraction patterns of a charging product of a foamed nickel positive electrode at 70° C.

The charging product of each of the above-described active materials obtained by charging in a 5.9M KOH solution at 23° C., 50° C., or 70° C. was analyzed by X-ray diffractometry. The diffraction patterns obtained are shown in FIG. 7 (23° C.), FIG. 8 (50° C.), or FIG. 9 (70° C.). When charged at 23° C., every active material shows only the peak of $\beta$-NiOOH as a charging product as shown in FIG. 7, whereas the active material having the least cobalt content (1%) and charged at 50° C. shows the peak of unreacted nickel hydroxide in addition to the peak of $\beta$-NiOOH as shown in FIG. 8. Further, in charging at 70° C., unreacted nickel hydroxide was detected in the active material having a cobalt content of 1% or 8%. From these results, it is seen that where the nickel hydroxide active material is charged at a high temperature, progress of charging is accelerated with an increase of cobalt content, particularly in a range of 10% and more.

Figure 10:
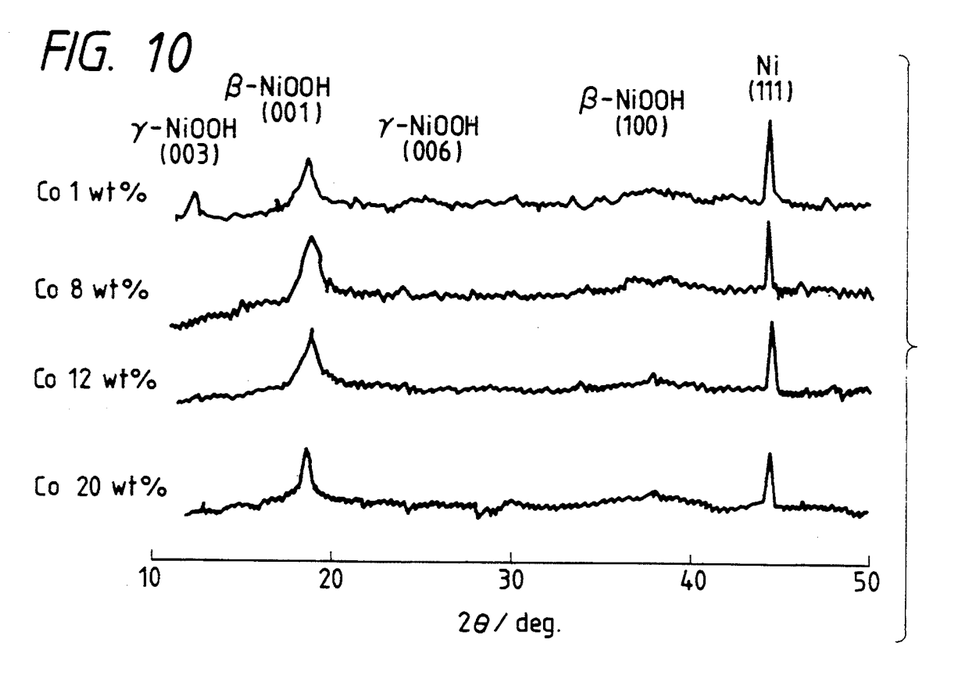
FIG. 10 is X-ray diffraction patterns of a charging product of a foamed nickel positive electrode at 0° C.

To clarify problems accompanying charging and discharging in low temperatures of 0° C. or below, the same test as described above was conducted, except that charging was at 0° C. The diffraction patterns of the charging product are shown in FIG. 10. The active material having the least cobalt content (1%) revealed $\gamma$-NiOOH. $\gamma$-NiOOH is well known to have a density of 3.79 g/cm$^3$, which is smaller than that of $\beta$-NiOOH, i.e., 4.68 g/cm$^3$. Besides, discharge of $\gamma$-NiOOH results in formation of $\alpha$-Ni(OH)$_2$, whose density is 2.82 g/cm$^3$ and smaller than that of $\beta$-Ni(OH)$_2$ produced from $\beta$-NiOOH, i.e., 3.97 g/cm$^3$. Accordingly, formation of $\gamma$-NiOOH causes greater expansion in volume at the time of not only charging but discharging.

Conventional nickel hydroxide electrodes using an active material with a small cobalt content suffer from expansion with the progress of charge-discharge cycles, resulting in a reduction of the battery life according to a so-called "dry up" phenomenon caused by depletion of electrolyte in separator leading to the increase of internal resistance. In particular, batteries using a plastic case are liable to swelling or deformation due to the expansion of the electrode. Such a tendency is outstanding in electrodes comprising a substrate having a porosity of 86% or higher having filled therein an active material with a small cobalt content. In addition, a highly porous substrate is inferior in electric conductance performance to those having a porosity of not more than 85% and a higher metal content as a collector. If such an electrode is subjected to rapid charging, the active material is liable to undergo nonuniform of current distribution. This being the case, charging, even at a temperature not so low, tends to be attended by formation of $\gamma$-NiOOH. Hence, it has been heretofore necessary to fill a porous substrate with an active material to such a degree that the substrate still retains a residual porosity of about 40% from empirical rule. Accordingly, the following experiments were conducted for the purpose of deciding an optimum cobalt content with which expansion of a positive electrode using a highly porous substrate accompanying charge-discharge can be inhibited.

Figure 11:
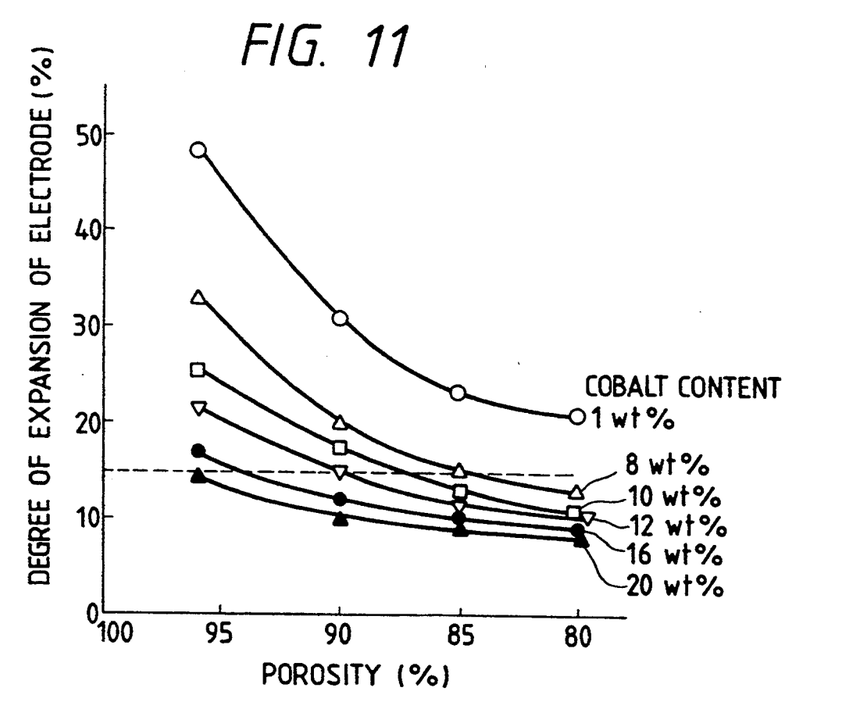
FIG. 11 is a graph of porosity vs. degree of expansion of a foamed nickel positive electrode.

A nickel hydroxide active material having a cobalt content of 1, 8, 10, 12, 16, or 20% was filled in a foamed nickel substrate having a porosity of 80, 85, 90, or 96% to prepare a positive electrode having a size of 30×40×1.0 mm and a residual porosity of about 30% by the process of filling and pressing. The positive electrode was assembled with a sintered cadmium electrode having a sufficiently high capacity as a negative electrode and 5.8M potassium hydroxide solution as electrolyte into a flooded type cell. The resulting cell was subjected to 10 cycles of charging at a current of 500 mA for 1.5 hours and discharging at 250 mA to an end discharge voltage of 0.8 V/cell at 0° C. A degree of expansion of the electrode was calculated from the thicknesses measured before and after the test. The results obtained are shown in FIG. 11. As can be seen from FIG. 11, the higher the porosity of the substrate, the greater the effect of the active material having a high cobalt content on inhibition of expansion of the electrode. In generally speaking, as far as the electrode has a degree of expansion of not more than 15%, i.e., within the region below the dotted line of FIG. 11, it can be applied to batteries for uses subject to charge-discharge cycles. Where an active material having a cobalt content of from 10 to 20%, $\gamma$-NiOOH causing deterioration of an electrode is not substantially suppressed. As a result, a substrate having a high porosity of 86% or more can be used while, after being filled with an active material, having a residual porosity of 30% that has not heretofore been permitted due to expansion.

The above test results ascertained that improvement in charging efficiency at high temperatures of 50° C. or more, inhibition of expansion of an electrode at low temperatures of 0° C. or less, and increase in battery energy density can be achieved simultaneously by using an active material having a cobalt content of from 10 to 20% and a substrate having a porosity of 86% or more. Further, while a thick electrode having a thickness of from 1 to 4 mm has been inapplicable to batteries because it causes appreciable deterioration due to its expansion, use of the above-mentioned active material inhibits the expansion, making it possible to apply such a thick electrode to batteries.

EXAMPLE 2

A sintered nickel substrate having a porosity of 90% which was obtained by sintering carbonyl nickel powder was impregnated with a mixed solution (pH=2) containing nickel nitrate and cobalt nitrate at a metallic ratio varying from 5 to 20% at 80° C. for 10 minutes and then immersed in a sodium hydroxide aqueous solution having a specific gravity of 1.20 (20° C.) at 60° C. for 30 minutes. The substrate was washed with hot water (80° C.) and then dried at 100° C. for 30 minutes. These operations were repeated 7 times to prepare a sintered positive electrode having a size of 30×40×0.6 mm and a theoretical capacity of about 350 mAh based on the one electron change reaction of Ni(OH)$_2$ to NiOOH.

The electrode was wrapped in 0.2 mm thick polyamide nonwoven cloth and then assembled with a sintered cadmium negative plate having a sufficiently high capacity into a flooded type cell. The resulting cell was tested by repeatedly subjecting to charge-discharge cycles using a 5.8M potassium hydroxide solution, a 5.8M sodium hydroxide solution, or a mixed solution of 4.3M sodium hydroxide and 1.5M potassium hydroxide as an electrolyte as follows.

Figure 12:
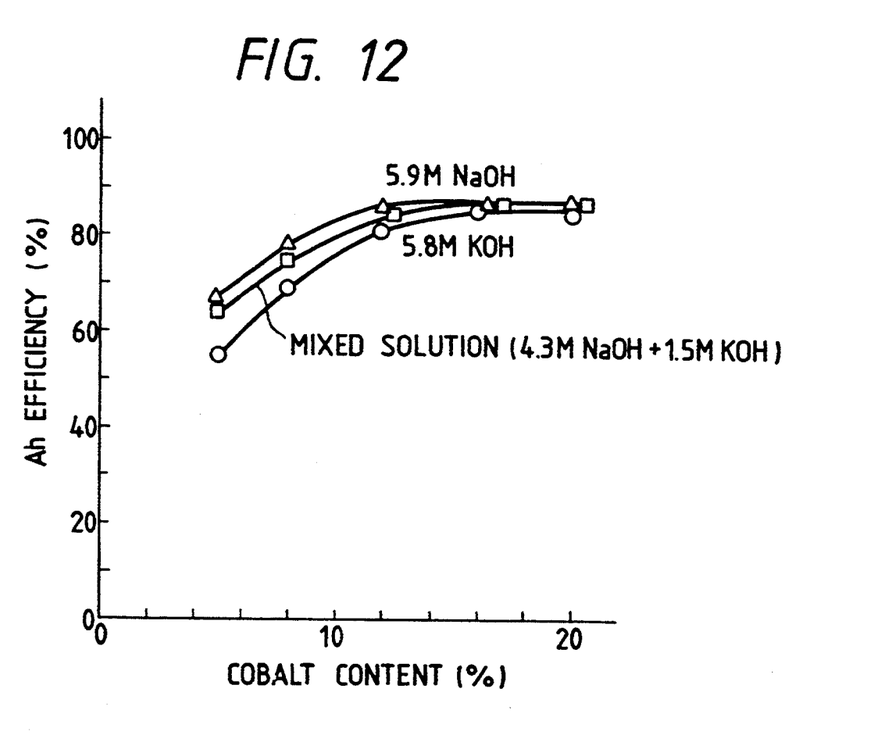
FIG. 12 is a graph of cobalt content vs. Ah efficiency of a sintered nickel positive electrode.

First of all, charging and discharging were conducted three times each at 25° C. with a charging and discharging current of 0.2 C for formation. After confirming the capacity, a charge-discharge test was carried out at 70° C. under the following conditions.
Conditions of the 4th and 5th cycles:
 Charge: 70 mA (0.2 C) for 5 hrs
 Discharge: 70 mA (0.2 C) to an end discharge voltage of 0.8 V/cell
Conditions of the 6th cycle:
 Charge: 70 mA (0.2 C) to the amount of electricity discharged in the 5th cycle Discharge: 70 mA (0.2 C) to an end discharge voltage of 0.8 V/cell An Ah efficiency calculated from the charge-discharge test results of the 6th cycle is shown in FIG. 12. The tendency observed in the case of using a sintered nickel hydroxide positive electrode is similar to that in Example 1. It is seen that the active material containing 10% or more of cobalt hydroxide in the form of a solid solution exhibits excellent Ah efficiency in a high temperature of 70° C. The Ah efficiency exerts a great influence on changes of discharge capacity with progress of charge-discharge cycles in high temperatures as hereinafter described. Capacity reduction is particularly conspicuous in sealed batteries in which a safety valve is set at a low pressure below 4 kg/cm$^2$.

EXAMPLE 3

In Example 3, batteries using the nickel hydroxide electrode of the present invention as a positive electrode were prepared to conduct a life test.

A sintered nickel hydroxide positive electrode having a cobalt content of 8, 12, or 16% was prepared in the same manner as in Example 2. The electrode had a size of 49×63×0.78 mm and a theoretical capacity of 1.1 Ah.

Fifty parts of cadmium oxide powder, 50 parts of metallic cadmium powder, 5 parts of nickel hydroxide, and 0.10 part of polypropylene short fiber having a fiber length of 1 mm were mixed with 30 ml of ethylene glycol containing 1.5% polyvinyl alcohol to prepare a paste. The resulting paste was applied to a nickel-plated (9 μm) perforated steel plate, dried at 100° C. for 30 minutes, and pressed to the same size as the positive electrode to prepare a cadmium negative electrode. The negative electrode had a theoretical capacity of 1.5 Ah.

Figure 13:
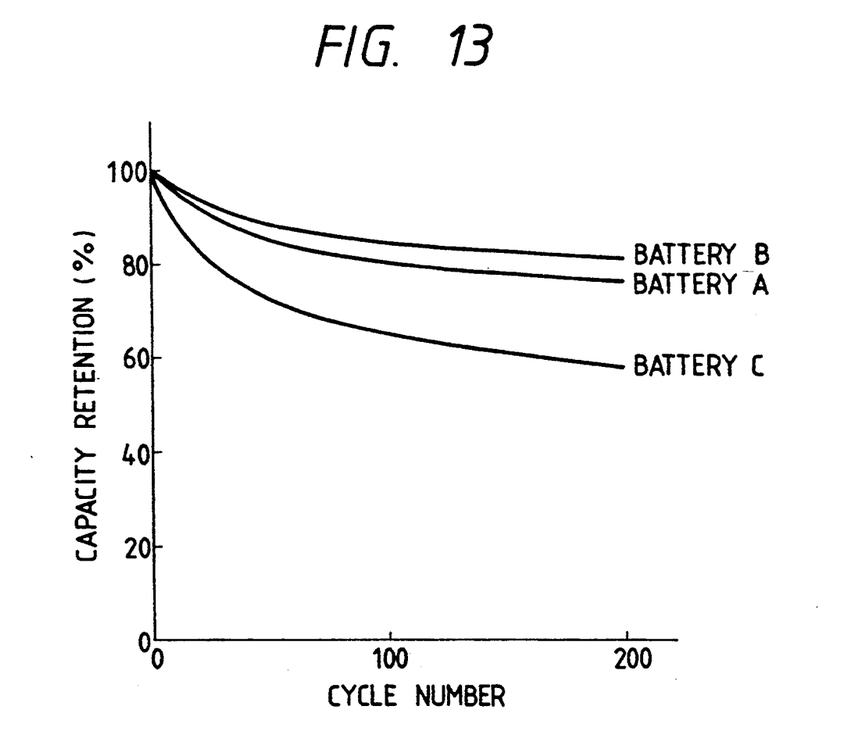
FIGS. 13 and 14 each show the capacity retention of a nickel-cadmium battery using the nickel hydroxide electrode of the present invention as a positive electrode as compared with a conventional battery.
Figure 14:
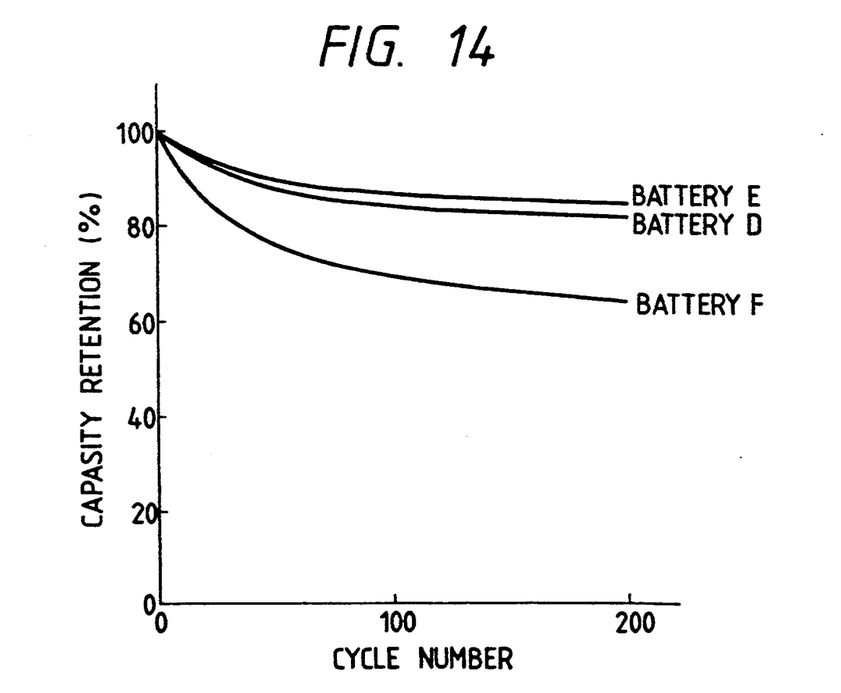

The positive electrode was wrapped in a 0.2 mm thick polyamide nonwoven cloth. Nine wrapped positive electrodes and 10 negative electrodes were alternately assembled into a electrode unit with the negative electrode on both sides. The electrode unit was put in a plastic battery case having 41 ml of a 5.8M potassium hydroxide solution or a 5.8M sodium hydroxide solution as an electrolyte to prepare a sealed battery having an outer size of 59×23×125 mm and a nominal capacity of 8 Ah. The battery was fitted with a safety valve operating at a pressure of 0.5 kg/cm$^2$. The battery using a KOH solution and having a cobalt content of 12 or 16% was designated battery A or B for the present invention, respectively. The battery using an NaOH solution and having a cobalt content of 12 or 16% was designated battery D or E for the present invention, respectively. The battery having a cobalt content of 8% (comparison) and using a KOH solution or an NaOH solution was designated battery C or F, respectively. Each of batteries A to F was subjected to a life test in charge-discharge cycles. Charging was conducted with a constant current in two steps, first at 160 mA and then, after a battery voltage reached the setting voltage of 1.43 V/cell, at 60 mA in a total charging time of 8 hours at 50° C. Discharging was done with a constant current of 160 mA to an end voltage of 0.8 V/cell at 50° C. The capacity retention of batteries A, B, and C vs. number of cycles is shown in FIG. 13. The capacity of the conventional battery C was reduced to below 60% of the initial level after 200 cycles. To the contrary, battery A having a cobalt content of 12% retained 76% of the initial capacity after 200 cycles, and battery B having a cobalt content of 16% retained 81% of the initial capacity after 200 cycles. It is thus seen that a battery whose safety valve operates at a low pressure suffers from a large reduction in capacity with the progress of cycles unless a positive electrode of high Ah efficiency is used. The capacity retention of batteries D, E, and F vs. number of cycles is shown in FIG. 14. The tendency to reduction of capacity is similar to that observed with the cases where a KOH electrolyte is used, indicating superiority of the battery according to the present invention. It is also apparent that the reduction in capacity is smaller in batteries using an NaOH electrolyte than in batteries using a KOH electrolyte with the cobalt content being equal. However, being less electric conductivity than a KOH aqueous solution, an NaOH solution is inferior in higher discharging rate particularly in a low temperature environment. Therefore, for uses needing high power on acceleration such as electric vehicles it is desirable to use a mixed solution of NaOH and KOH.

EXAMPLE 4

A sintered nickel hydroxide positive electrode having a cobalt content of 8, 12, or 16% was prepared in the same manner as in Example 2. The electrode had a size of 49×63×0.78 mm and a theoretical capacity of 1.1 Ah.

Eighty parts of zinc oxide powder, 20 parts of metallic zinc powder, and 0.2 part of polyamide short fiber having a fiber length of 1 mm were mixed, and 30 parts of propylene glycol was added thereto to prepare a paste. To the paste was further added 3 parts of a 60% dispersion solution of polytetrafluoroethylene powder, followed by kneading. The paste was applied to a 0.1 mm thick copper punching metal by means of a pressure roll, dried at 150° C. for 30 minutes, and pressed again to obtain a negative plate having the same size as the positive electrode and a theoretical capacity of 1.5 Ah (based on zinc oxide).

The positive electrode was wrapped in a separator composed of a piece of 0.1 mm thick polyamide nonwoven cloth and a 25 μm thick finely porous polyethylene film, followed by heat sealing. The negative electrode was wrapped in a 0.1 mm thick polyamide nonwoven cloth. Nine positive electrodes and ten negative electrodes were alternately assembled into a electrode unit with the negative electrode on both sides. The electrode unit was put in a plastic battery case having. 40 ml of a 8.5M KOH aqueous solution saturated with zinc oxide to prepare a sealed battery having an outer size of 59×23×125 mm and a nominal capacity of 8 Ah. The battery was fitted with a safety valve operating at a pressure of 0.5 kg/cm$^2$. The battery with a cobalt content of 12%, 16% for the present invention, or 8% (comparison) was designated battery G, H, or I, respectively.

Figure 15:
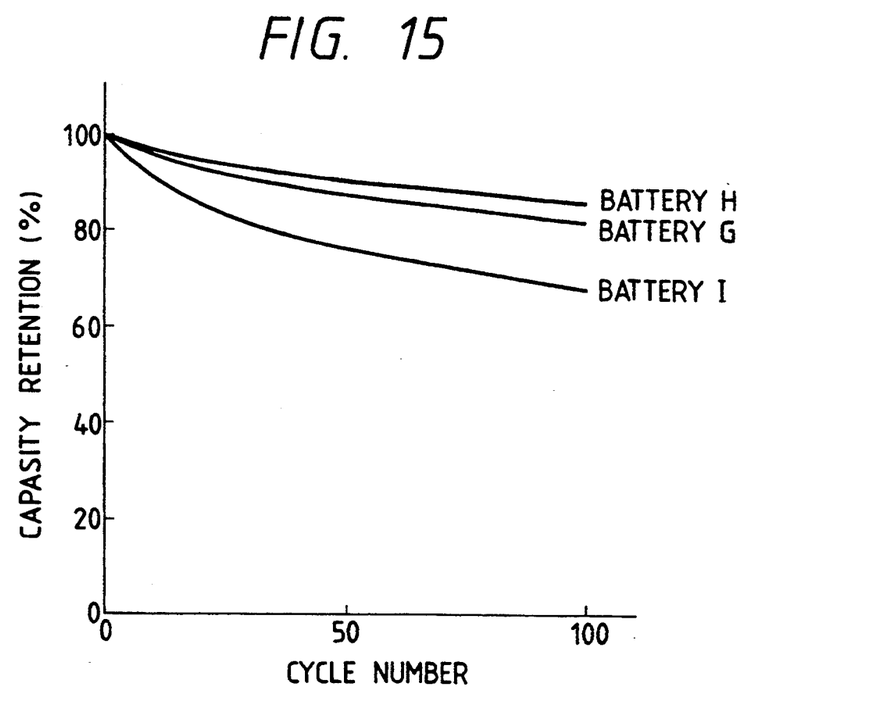
FIG. 15 shows the capacity retention of a nickel-zinc battery using the nickel hydroxide electrode of the present invention as a positive electrode as compared with a conventional battery.

Each of batteries G to I was subjected to a cycle test in which charging was done with a constant current of 160 mA until the battery voltage reached the sentting voltage of 1.9 V/cell and thereafter with a constant current of 40 mA in a total charging time of 8 hours and discharging was conducted with a constant current of 160 mA to an end voltage of 1.4 V/cell both at 50° C. The change of capacity with the progress of the charge-discharge cycles is shown in FIG. 15. It is seen that the reduction in capacity is suppressed in the batteries according to the present invention similarly to Example 3.

EXAMPLE 5

A sintered nickel hydroxide positive electrode having a cobalt content of 8, 12, or 16% was prepared in the same manner as in Example 2. The electrode had a size of 49×63×0.78 mm and a theoretical capacity of 1.1 Ah.

A hundred parts of a hydrogen-absorbed alloy powder having a formula of $LmNi_{3.8}Co_{0.7}Al_{0.5}$ (Lm means a lanthanum-rich Misch metal having a lanthanum content of about 90%), 17 parts of bismuth oxide, 3 parts of carbon black, and 0.10 part of polypropylene short fiber having a fiber length of 1 mm were mixed together with 30 ml of a 3% polyvinyl alcohol solution to prepare a paste. The paste was applied to a nickel-plated (9 $\mu$m) perforated steel plate, dried at 80° C. for 1 hour, and pressed to obtain a metal hydride negative electrode having a size of 49×63×0.48 mm and a theoretical capacity of 1.6 Ah.

Figure 16:
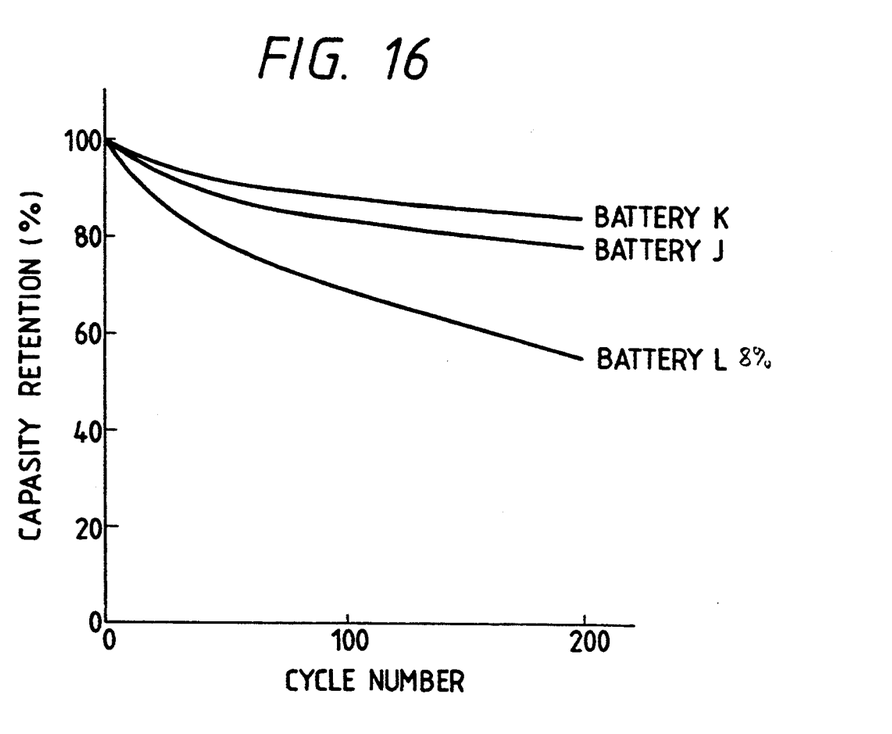
FIG. 16 shows the capacity retention of a nickel-metal hydride battery using the nickel hydroxide electrode of the present invention as a positive electrode as compared with a conventional battery.

The positive electrode was wrapped in 0.18 mm thick polyamide nonwoven cloth, and 10 positive electrodes and 11 negative electrodes were alternately assembled into a electrode unit with the negative electrode on both sides. The electrode unit was put in a nickel-plated iron battery case having 42 ml of a 5.8M KOH solution to prepare a sealed battery having an outer size of 59×23×125 mm and a nominal capacity of 9 Ah. The battery was fitted with a safety valve operating at a pressure of 4 kg/cm². The battery having a cobalt content of 12%, 16% for the present invention, or 8% (comparison) was designated as battery J, K, or L, respectively. Each battery was subjected to a cycle life test in which charging was conducted with a constant current of 180 mA until the battery voltage reached the setting voltage of 1.42 V/cell and thereafter with a constant current of 90 mA in a total charging time of 8 hours and discharging was done with a constant current of 180 mA to a final voltage of 0.8 V/cell both at 50° C. The reduction in capacity with the progress of charge-discharge cycles is shown in FIG. 16. It is seen that the reduction in capacity is suppressed in the batteries according to the present invention similarly to Example 3.

It has thus been ascertained that a nickel hydroxide electrode using a cobalt-added active material and a substrate having a porosity of from 86 to 98% exhibits improved Ah efficiency with the cobalt content in the active material falling within a range of from 10 to 20%. The effect of improving Ah efficiency is particularly pronounced on high temperature charging at 50° C. or more. Further, an alkaline storage battery using such a nickel hydroxide electrode as a positive electrode exhibits markedly improved capacity retention with the progress of charge-discharge cycles.

In using the nickel hydroxide positive electrode with excellent charging efficiency, the necessity of overcharging can be excluded so that the Wh efficiency required for charging becomes so much high. Besides, oxygen evolution from the positive electrode or oxygen gas recombination on the negative electrode can be suppressed so that heat generation associated therewith can be reduced. Therefore, when a plurality of these batteries are assembled in series or parallel for practical use such as power sources for the electric vehicles, a distribution in temperature among cells can be minimized. That is, since variation in voltage among cells is controlled, the precision of voltage control in, for example, voltage detection or constant voltage charging is improved.

As described above, the present invention provides a nickel hydroxide electrode using a substrate having a porosity of from 86 to 98% which has a high Ah efficiency and a high active material utilization in a wide range of temperature and particularly a prolonged life in low temperatures of 0° C. or less and an improved charging efficiency in high temperatures of 50° C. or more, by incorporating cobalt hydroxide into a nickel hydroxide active material in the form of a solid solution at a metallic ratio of from 10 to 20% by weight. According to the invention, oxygen evolution on charge and oxygen recombination involved on a negative electrode can be suppressed thereby reducing heat generation. Accordingly, in a practical use of these batteries in series with from 100 to 200 v, a temperature distribution among cells is made uniform, precision in voltage detection or constant voltage charging is improved, and voltage control becomes easy. Further, formation of $\gamma$-NiOOH is inhibited, making the volume change of the active material smaller. A prismatic sealed alkaline storage battery using the above-mentioned electrode as a positive electrode has an extended life in charge-discharge cycles.

While the invention has been described in detail and with reference to specific examples thereof, it will be apparent to one skilled in the art that various changes and modifications can be made therein without departing from the spirit and scope thereof.

What is claimed is:

1. A prismatic sealed alkaline storage battery with a nickel hydroxide electrode, comprising:
    a nickel hydroxide active material containing from 12 to 20% by weight of cobalt based on the sum of nickel and cobalt; and
    a substrate for holding said active material, said substrate having a porosity of from 86 to 98%.

2. A prismatic sealed alkaline storage battery as claimed in claim 1, wherein said substrate is a sintered plaque of carbonyl nickel powder.

3. A prismatic sealed alkaline storage battery as claimed in claim 1, wherein said nickel hydroxide active material is spherical particles and said substrate is a metallic foamed plaque or a metallic fibrous plaque.

4. A prismatic sealed alkaline storage battery as claimed in claim 1, further comprising an electrolyte of a mixed solution of sodium hydroxide and potassium hydroxide.

5. A prismatic sealed alkaline storage battery as claimed in claim 1, further comprising a plastic case.

6. A prismatic sealed alkaline storage battery as claimed in claim 1, further comprising a negative electrode of one of cadmium, zinc, and hydrogen-absorbed alloy.

7. A prismatic sealed alkaline storage battery as claimed in claim 1, further comprising a safety valve operating at a pressure of not more than 4 kg/cm².

8. A prismatic sealed alkaline storage battery as claimed in claim 1, wherein said nickel hydroxide electrode has a residual porosity of from 30 to 40%.

9. A prismatic sealed alkaline storage battery as claimed in claim 1, wherein said nickel hydroxide electrode has a thickness of from 1 to 4 mm.

10. A prismatic sealed alkaline storage battery as claimed in claim 5, wherein said plastic case has a monoblock structure.

11. A prismatic sealed alkaline storage battery as claimed in claim 10, wherein said monoblock structure comprises monoblock modules arranged as battery packs.

12. A prismatic sealed alkaline storage battery as claimed in claim 1, wherein said nickel hydroxide active material contains from 16 to 20% by weight of cobalt based on the sum of nickel and cobalt.

* * * * *